United States Patent [19]
Ikeda

[11] Patent Number: 6,072,775
[45] Date of Patent: Jun. 6, 2000

[54] SOURCE TRAFFIC CONTROL METHOD IN ATM NETWORK TO PREVENT SERIOUS LOCAL CONGESTION

[75] Inventor: Chinatsu Ikeda, Tokyo, Japan

[73] Assignee: NEC Corporation, Tokyo, Japan

[21] Appl. No.: 08/856,169

[22] Filed: May 14, 1997

[30] Foreign Application Priority Data

May 15, 1996 [JP] Japan ................................ 8-119943

[51] Int. Cl.[7] ................................ H04J 1/00; H04J 1/16; H04L 12/26
[52] U.S. Cl. ................................ 370/236; 370/235
[58] Field of Search ................................ 370/231, 230, 370/232, 233, 234, 235, 236, 468

[56] References Cited

U.S. PATENT DOCUMENTS 5,805,577  9/1998  Jain et al. ................................ 370/234

FOREIGN PATENT DOCUMENTS 3-220838  9/1991  Japan .

OTHER PUBLICATIONS

"Traffic Management Specification, Version 4.0", The ATM Forum Technical Committee, Mar. 1996, pp. 1–100.
"ATM–LAN", Feb. 10, 1995, pp. 122–127.

*Primary Examiner*—Huy D. Vu
*Assistant Examiner*—Kevin C. Harper
*Attorney, Agent, or Firm*—Sughrue, Mion, Zinn, Macpeak & Seas, PLLC

[57] ABSTRACT

In an ATM network, a source end system is connected through multiple virtual channels to destination end systems to exchange resource management (RM) cells at periodic intervals and transmit data cells at allowed cell rates (ACRs) respectively set for the virtual channels. The source end system transmits a forward RM cell through an associated virtual channel, and determines a sum of ACR values of the virtual channels in response to receipt of a backward RM cell through the associated virtual channel and compares the sum of ACR values with a predetermined capacity of the access link. The source end system resets a current ACR value of the associated virtual channel equal to a lower-than-previous value when the sum of ACR values is in excess of the predetermined link capacity. In one embodiment, the sum of ACR values is divided by the predetermined link capacity to produce a link load value and the ACR value is reset according to the link load value.

9 Claims, 4 Drawing Sheets

6,072,775

SOURCE TRAFFIC CONTROL METHOD IN ATM NETWORK TO PREVENT SERIOUS LOCAL CONGESTION

BACKGROUND OF THE INVENTION

1. Field of the Invention

The present invention relates generally to ATM (asynchronous transfer mode) networks, and more specifically to a traffic control method for controlling source user traffic on an access link to an ATM network.

2. Description of the Related Art

In an ATM network, resource management cells are exchanged between source and destination end systems (user terminals) at periodic intervals to regulate the source traffic according to control data inserted into a received RM cell by the network. As described in "Traffic Management Specification Version 4.0", The ATM Forum, Technical Committee, March 1996, the source end system transmits data cells at an allowed cell rate (ACR) over an established virtual channel and this ACR value is altered according to the received control data. Since the ATM system allows an end system to establish multiple virtual channels simultaneously to different destinations, while the source traffic is controlled on a per-channel basis, there is a likelihood of the user's access link being overloaded. If the overloaded condition is left unattended, a serious local congestion would develop at the source end system.

SUMMARY OF THE INVENTION

It is therefore an object of the present invention to prevent serious local traffic congestion in an ATM network.

According to the present invention, there is provided a method for controlling the traffic of a source end system connected by an access link to an ATM network, wherein the source end system is connected through a plurality of virtual channels to destination end systems, to exchange resource management (RM) cells at periodic intervals and to transmit data cells at allowed cell rates (ACRs) respectively set for the virtual channels. The method comprises the steps of (a) transmitting a forward RM cell through an associated virtual channel, (b) determining a sum of ACR values of the virtual channels in response to receipt of a backward RM cell through the associated virtual channel and comparing the sum of ACR values with a predetermined capacity of the access link, and (c) resetting a current ACR value of the associated virtual channel equal to a lower-than-previous value when the sum of ACR values is in excess of the predetermined link capacity.

The step (c) may comprise the steps of producing a link load value representing the sum of ACR values divided by the predetermined link capacity, and resetting the ACR value to the lower-than-previous value according to the link load value. The step (c) may comprise the steps of producing a link load value representing the sum of ACR values divided by the predetermined link capacity, producing a fair share value representing a weighted mean of ACR values of virtual channels through which backward RM cells are successively received, comparing the current ACR value of the associated virtual channel with the fair share value, dividing the current ACR value by the link load value if the current ACR value is greater than the fair share value, comparing the divided ACR value with the fair share value, and resetting the current ACR value equal to the divided ACR value if the divided ACR value is greater than the fair share value and resetting the current ACR value equal to the fair share value if the fair share value is greater than the divided ACR value.

BRIEF DESCRIPTION OF THE DRAWINGS

The present invention will be described in further detail with reference to the accompanying drawings, in which.

DETAILED DESCRIPTION

Figure 1:
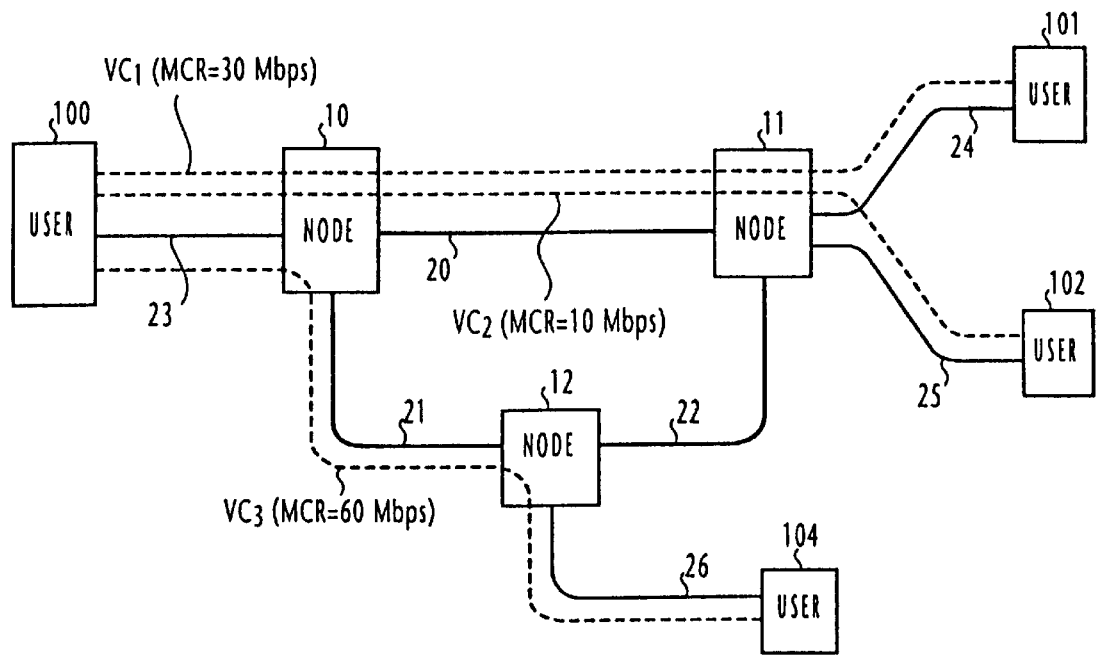
FIG. 1 is a block diagram of an exemplary ATM network for describing the present invention.
Figure 2:
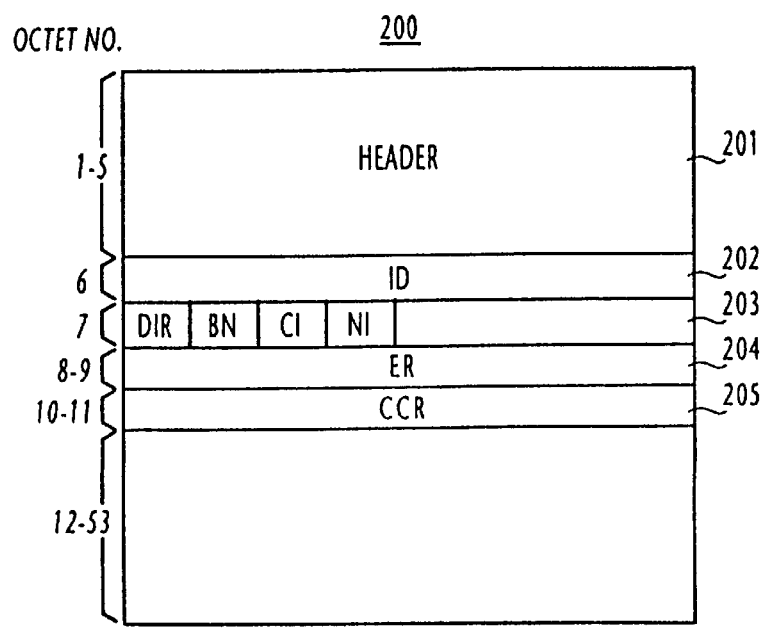
FIG. 2 is an illustration of a control cell used in the network.

Referring now to FIG. 1, there is shown an exemplary ATM (asynchronous transfer mode) network for describing the rate control algorithm of the present invention. The exemplary network is formed by ATM nodes 10, 11 and 12 interconnected by links 20, 21 and 22. End systems, or user terminals 100, 101, 102 and 103 are connected to the network by links 23 to 26. For the purpose of disclosure, user terminal 100 establishes ABR (available bit rate) virtual channels $VC_1$, $VC_2$ and $VC_3$ to destination user terminals 101, 102 and 103, respectively. The minimum cell rate (MCR) values of $VC_1$, $VC_2$ and $VC_3$ are 30 Mbps, 10 Mbps and 60 Mbps, respectively. When establishing a virtual channel, the source terminal determines an allowed cell rate (ACR) and inserts the value of this rate into the current cell rate (CCR) field of a forward resource management (FRM) cell 200, or FRM cell as shown in FIG. 2. The FRM cell is transmitted from the source user terminal at periodic intervals to the destination. Note that a "0" bit is initially set into each of the congestion sub-fields CI and NI of the cell 200, indicating that no congestion exists. In response to each forward RM cell, the destination terminal returns a backward RM cell to the source terminal. As the returning BRM cell propagates through the network, intermediate nodes insert a serviceable cell rate into the explicit rate (ER) field of the BRM cell and rewrites the CI (congestion indication) and NI (no increase) fields where appropriate. Since each virtual channel has a particular value of allowed cell rate, the transmission rate of RM cells of each virtual channel differs from the transmission rate of RM cells of the other virtual channels.

Following the transmission of a forward RM cell from the source terminal on a given virtual channel, data cells are transmitted at the allowed cell rate. The symbols ID, DIR and BN in FIG. 2 are "identifier", "direction of transmission" and "backward notification", respectively. As will be described later, the ACR of each virtual channel is modified according to the present invention and subsequent data cells are transmitted at the modified ACR rate and the CCR field of a subsequent forward RM cell is updated with the modified ACR value.

Figure 3:
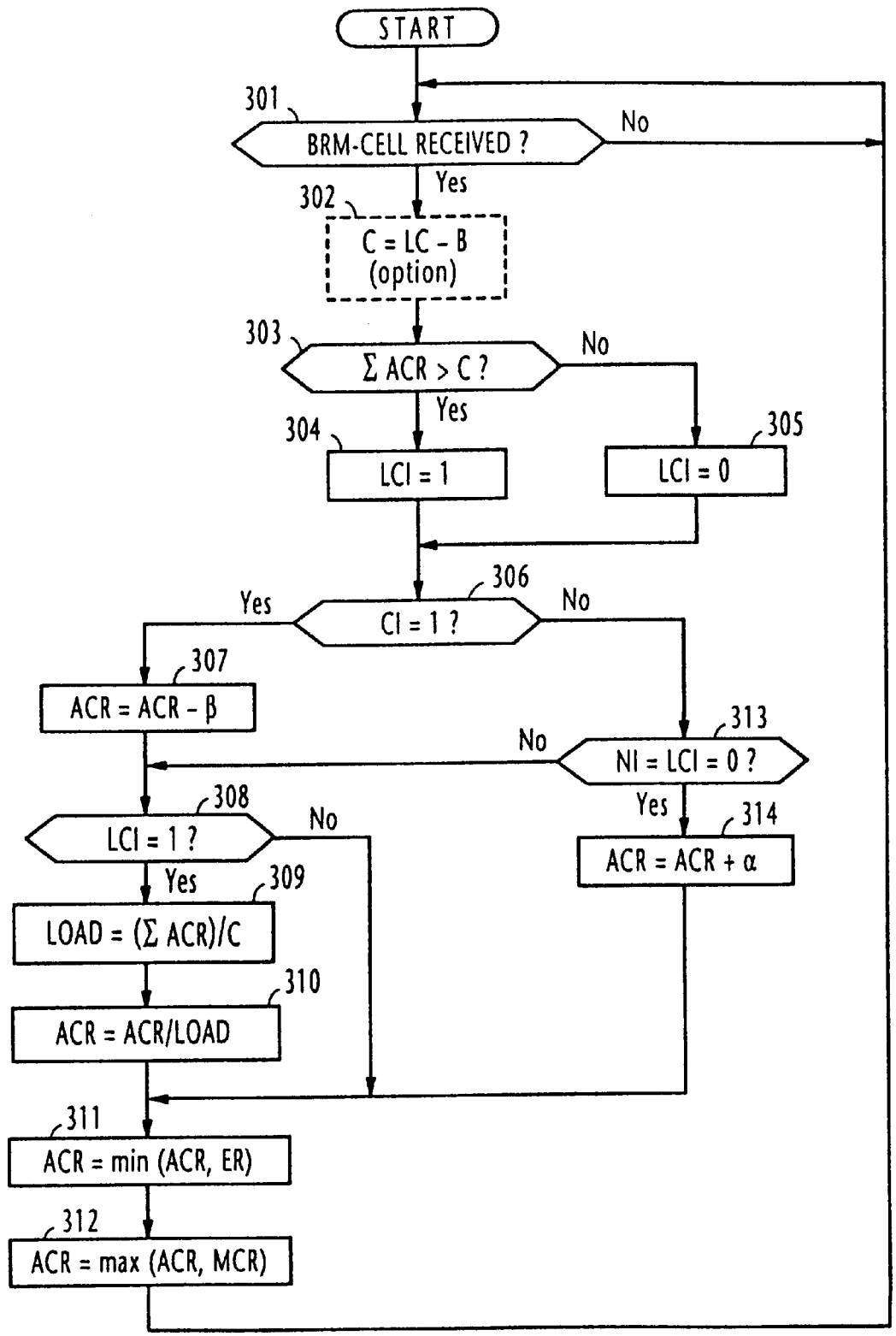
FIG. 3 is a flowchart of the operation of an ATM node according to a first embodiment of the present invention.

The ACRs of established virtual channels are modified at the source user terminal according to the flowchart shown in FIG. 3. Following the transmission of a FRM cell over a virtual channel, the source user terminal monitors the reception of a BRM cell at step 301. When a BRM cell is received on a virtual channel, the source user terminal reads the CI, NI and ER data from the received BRM cell and stores them into a memory. Flow proceeds to optional step 302. If the network accommodates a plurality of service classes, it is preferable to exclude the total bandwidth (B) of virtual channels of higher class than ABR virtual channels. If the source terminal is using a higher grade service, step 302 is executed for subtracting the bandwidth B from the capacity (LC) of access link 23 and setting the subtracted capacity as an effective value (C) of the link capacity.

At step 303, a sum of the ACR values of all virtual channels is obtained and compared with the link capacity C. If the former is larger than the latter, it is determined that there is a local congestion and flow proceeds from step 303 to step 304 to set a local congestion indication (LCI) flag to 1. Otherwise, flow proceeds to step 305 to set the LCI flag to 0.

At step 306, the source user terminal examines the CI bit of the received BRM cell. If the CI bit is "1", the source user determines that a virtual channel from which the BRM cell was received is congested and flow proceeds from step 306 to step 307 to decrement the ACR value of the virtual channel by a fixed correction value β. The LCI flag is then examined at step 308. If LCI=1, flow proceeds to step 309 where the traffic load of the access link 23 is calculated by dividing the sum of the ACR values of all virtual channels with the effective link capacity C. At step 310, the ACR value is divided by the traffic load (LOAD).

At step 311, ACR is compared with ER and the smaller of the two is selected as a new ACR value, which is further compared, at step 312, with MCR of the current virtual channel and the smaller of the two is selected as a final ACR value of the current virtual channel.

If CI=0, flow proceeds from step 307 to step 313 to check to see if both of the NI and LCI of the received BRM cell are 0. If so, flow proceeds from step 313 to step 314 to increment the current ACR by a fixed correction value α and then proceeds to execute steps 311 and 312. If the decision at step 313 is negative, flow proceeds to step 308. Following the execution of step 312, flow returns to step 301 to repeat the process on a subsequently arriving BRM cell.

The ACR updating algorithm of FIG. 3 will be best understood by the following description by assuming that the $ACR_1$, $ACR_2$, $ACR_3$ values of virtual channels $VC_1$, $VC_2$ and $VC_3$ are initially 50 Mbps, 50 Mbps and 100 Mbps, respectively, and the capacity of links 23 is 150 Mbps. Therefore, the link load is initially equal to (50+50+100)/150=1.33. Since the sum of all ACR values (=200 Mbps) is greater than the link capacity (=150 Mbps), it is determined that a local congestion has occurred and the decision at step 305 is affirmative, setting the LCI flag to 1 at step 306.

Assume that the CI and NI sub-fields of all virtual channels are set equal to "0" and the same ER values (50 Mbps) are inserted by the network. The traffic control parameters used in the following description are summarized as follows:

| | | | | | |
|---|---|---|---|---|---|
| $VC_1$ | $ACR_1$=50 | $ER_1$=50 | $MCR_1$=30 | $CI_1$=0 | $NI_1$=0 |
| $VC_2$ | $ACR_2$=50 | $ER_2$=50 | $MCR_2$=10 | $CI_2$=0 | $NI_2$=0 |
| $VC_3$ | $ACR_3$=100 | $ER_3$=50 | $MCR_3$=60 | $CI_3$=0 | $NI_3$=0 |

Since CI=0 and LCI=1 for all virtual channels, flow proceeds from step 308 to step 315 and then to step 310 where it branches off to steps 311, 312 and 313. Assume that BRM cells are successively received from $VC_1$, $VC_2$ and $VC_3$, successive executions of steps 310, 311 and 312 will produce the following results:

Step 310-1: $ACR_1$=50/1.33=37.5 Mbps
Step 311-1: $ACR_1$=min(37.5, 50)=37.5 Mbps
Step 312-1: $ACR_1$=max(37.5, 30)=37.5 Mbps
Step 310-2: $ACR_2$=50/1.25=40 Mbps
Step 311-2: $ACR_2$=min(40, 50)=40 Mbps
Step 312-2: $ACR_2$=max(40, 10)=40 Mbps
Step 310-3: $ACR_3$=100/1.18=84.8 Mbps
Step 311-3: $ACR_3$=min(84.8, 50)=50 Mbps
Step 312-3: $ACR_3$=max(50, 60)=60 Mbps At the end of the execution of these steps, $ACR_1$=37.5 Mbps, $ACR_2$=40 Mbps, and $ACR_3$=60 Mbps are obtained in sequence with a total traffic rate of 137.5 Mbps. Therefore, the user terminal 100 starts transmitting data cells at 37.5 Mbps on $VC_1$, 40 Mbps of $VC_2$ and 60 Mbps of $VC_3$. With the total ACR value being updated to a value lower than the link capacity, the arrival of subsequent BRM cells will cause the source user terminal to reset the LCI flag to zero at step 305, so that step 310 is skipped.

Figure 4:
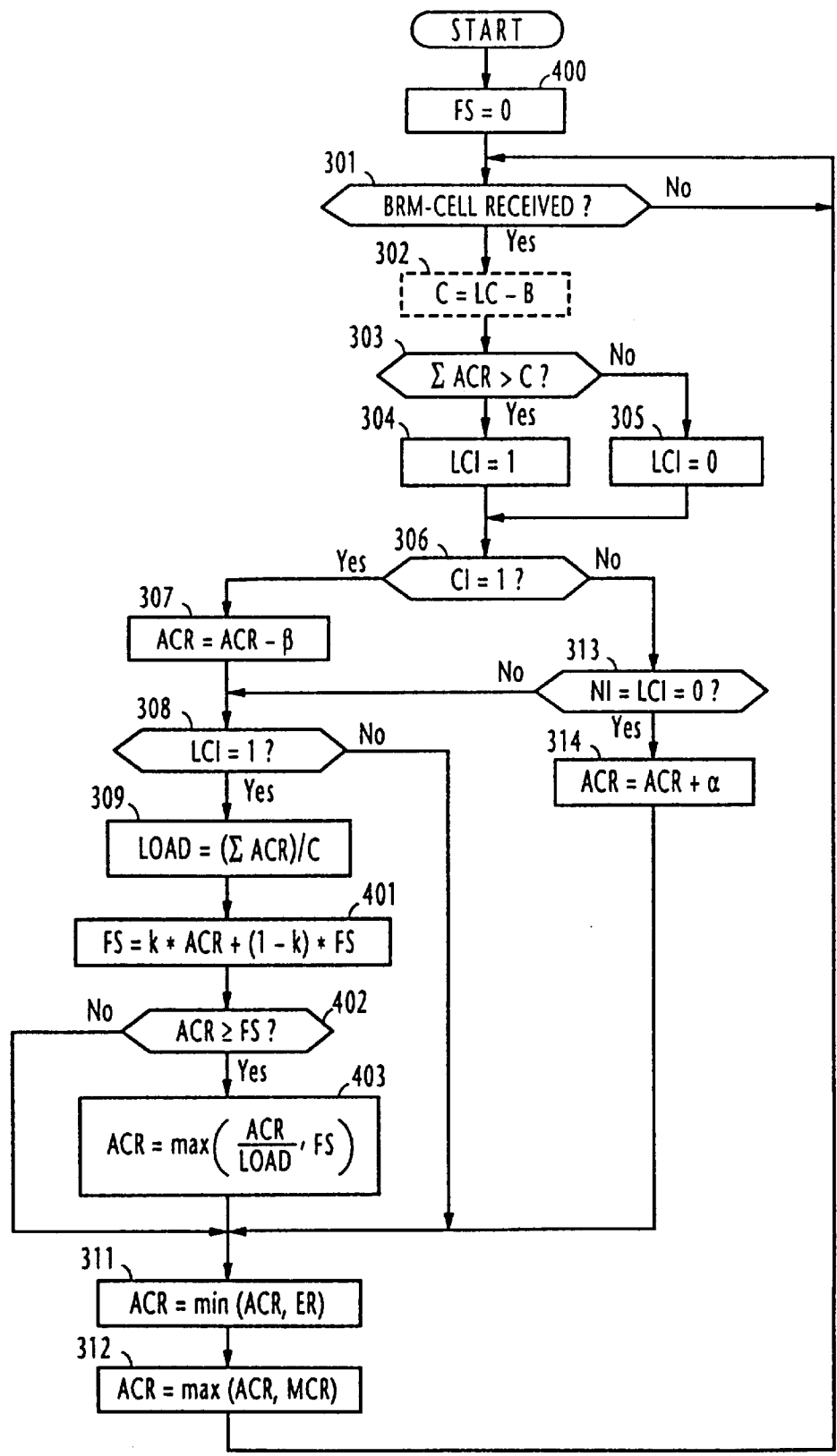
FIG. 4 is a flowchart of the operation of an ATM node according to a second embodiment of the present invention.

A modified embodiment of FIG. 3 is shown in FIG. 4 in which parts corresponding in significance to those of FIG. 3 are marked with the same numerals. The flowchart of FIG. 4 differs from the previous embodiment by the inclusion of steps 400 to 403, instead of step 310 of FIG. 3.

Following the starting point of the traffic control routine, step 400 is executed for setting a variable FS, and flow proceeds to step 301. The variable FS represents the "fair share" of the resource of link 23 to be shared among $VC_1$, $VC_2$ and $VC_3$ and is updated at step 401 for each successive arrival of a BRM cell according to the following equation:

$$FS_{n+1} = k \cdot ACR_n + (1-k) \cdot FS_n \qquad (1)$$

where, k is a constant in the range between zero and 0.5 and n represents the time indicator. Flow proceeds to step 402 to compare the ACR value of the current BRM cell with the fair share FS. For practical purposes, equation (1) represents a weighted mean value of two or more preceding ACR values. If the ACR value of the current BRM cell is equal to or greater than FS, flow proceeds from step 402 to step 403 to update ACR by solving the equation $$ACR = \max(ACR/LOAD, FS) \qquad (2)$$

by dividing ACR by the traffic load, comparing the quotient with FS and selecting the larger of the two as a new ACR value. The effect of step 403 is to ensure that the updated ACR value is not smaller than the fair share of the link capacity. If ACR is not greater than FS, flow branches at step 402 to step 311, skipping step 403.

Assuming that the coefficient k is 0.5, the FS value is 40 Mbps at a given instant of time and BRM cells are successively received from $VC_1$, $VC_2$ and $VC_3$, steps 401, 403, 311 and 312 are repeatedly executed, yielding the following results:

Step 401-1: FS=40 Mbps
Step 403-1: $ACR_1$=max(50/1.33, 40)=40 Mbps
Step 311-1: $ACR_1$=min(40, 50)=40 Mbps
Step 312-1: $ACR_1$=max(40, 30)=40 Mbps
Step 401-2: FS=47.5 Mbps
Step 403-2: $ACR_2$=max(50/1.25, 47.5)=47.5 Mbps
Step 311-2: $ACR_2$=min(47.5, 50)=50 Mbps
Step 312-2: $ACR_2$=max(50, 10)=50 Mbps Step 401-3: FS=73.8 Mbps Step 403-3: $ACR_3$=max(100/1.183, 73.8)=84.53 Mbps Step 311-3: $ACR_3$=min(84.53, 50)=50 Mbps Step 312-3: $ACR_3$=max(50, 60)=60 Mbps Therefore, $ACR_1$=40 Mbps, $ACR_2$=50 Mbps, $ACR_3$=60 Mbps are sequentially obtained with a total traffic rate of 150 Mbps which is equal to the link capacity. With the total ACR value being set equal to the link capacity, the arrival of subsequent BRM cells will cause the source user terminal to reset the LCI flag to zero at step 305, so that steps 401 to 403 are skipped.

Figure 5A:
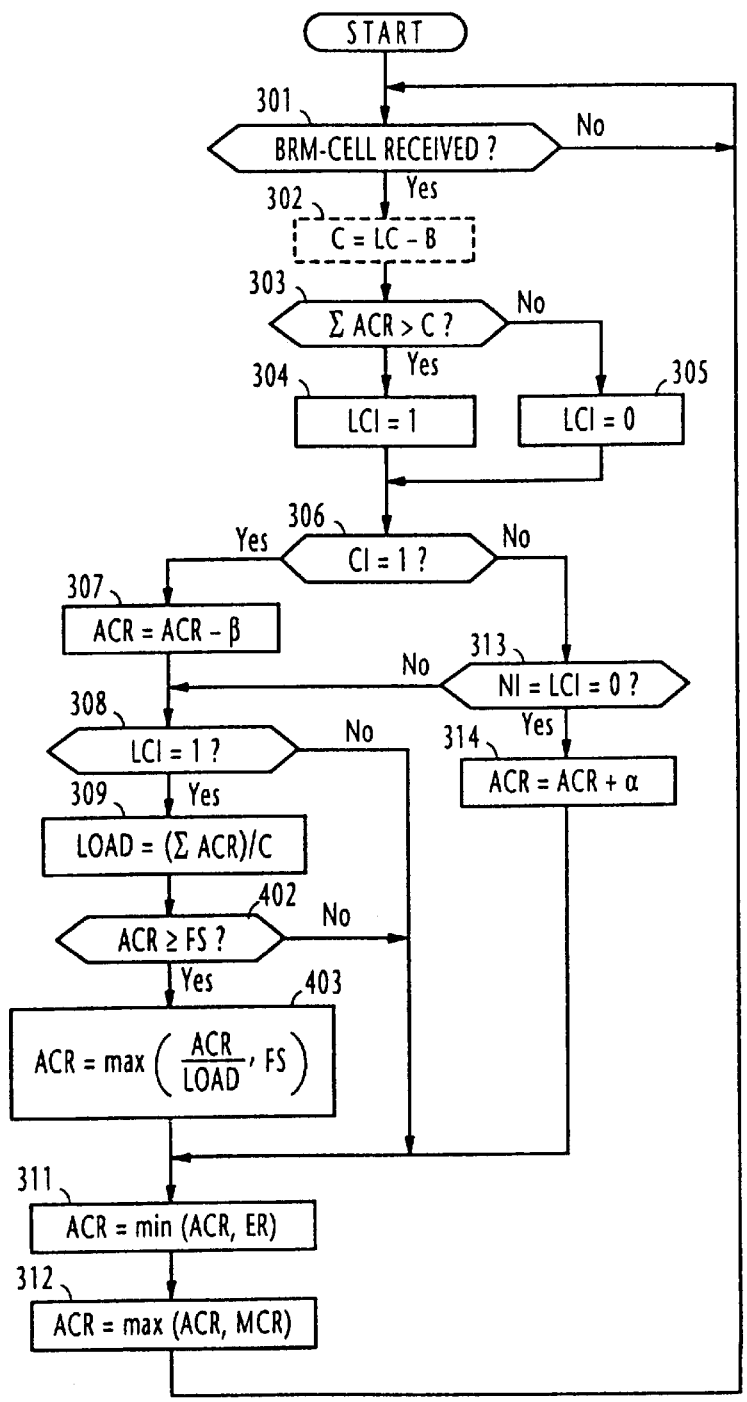
FIGS. 5A and 5B are flowcharts of a modification of the second embodiment of the present invention.
Figure 5B:
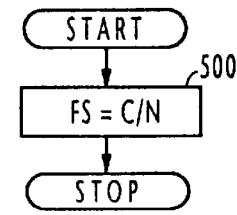

The embodiment of FIG. 4 is modified as shown in FIGS. 5A and 5B. In this modification, steps 400 and 401 of FIG. 4 are replaced with step 500 of FIG. 5B in which a common "fair share" (FS) value of the resource of link 23 is obtained by dividing the effective link capacity C (=150 Mbps) by the number of virtual channels N (=3). The FS value is therefore equal to 50 Mbps (=150/3). If BRM cells are successively received from $VC_1$, $VC_2$ and $VC_3$, steps 403, 312 and 313 are repeatedly executed, yielding the following results:

Step 403-1: $ACR_1$=max(50/1.33, 50)=50 Mbps

Step 311-1: $ACR_1$=min(50, 50)=50 Mbps

Step 312-1: $ACR_1$=max(50, 30)=50 Mbps

Step 403-2: $ACR_2$=max(50/1.33, 50)=50 Mbps

Step 311-2: $ACR_2$=min(50, 50)=50 Mbps

Step 312-2: $ACR_2$=max(50, 10)=50 Mbps

Step 403-3: $ACR_3$=max(100/1.33, 50)=75 Mbps

Step 311-3: $ACR_3$=min(75, 50)=50 Mbps

Step 312-3: $ACR_3$=max(50, 60)=60 Mbps

It is seen that the $ACR_1$, $ACR_2$, $ACR_3$ values are updated to 50 Mbps, 50 Mbps and 60 Mbps, respectively. Although the total traffic rate exceeds the 150 Mbps limit of the user's access link 23, the amount of excess is such that no severe local congestion occurs.

Figure 5C:
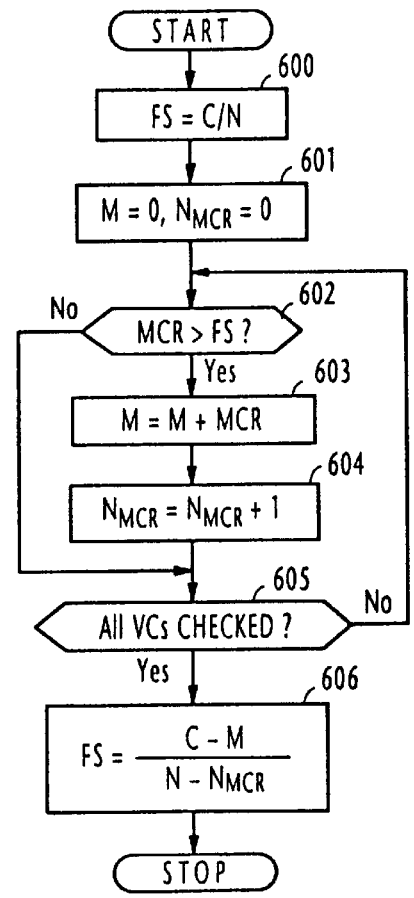
FIG. 5C is a flowchart of a modification of the flowchart of FIG. 5B.

The fair share of link capacity can also be obtained by a subroutine which takes into account the minimum cell rate (MCR) value of each virtual channel. As shown in FIG. 5C, this is achieved by excluding those virtual channels whose MCR values are greater than the fair share value FS=C/N obtained at step 600. At step 601, variables M and $N_{MCR}$ are set equal to 0, where M represents the total bandwidth of those virtual channels whose MCR values are greater than FS and $N_{MCR}$ represents the number of such virtual channels. At step 602, the MCR value of each virtual channel is compared with FS. If the former is greater than the latter, flow proceeds from step 602 to step 603 to increment the variable M by an amount equal to the MCR value of that virtual channel. At step 604, the variable $N_{MCR}$ is incremented by 1. If MCR is not greater than FS at step 602, flow proceeds to step 605 to repeat steps 602 to 604 for the remaining virtual channels. When steps 602 to 604 are performed on all virtual channels, flow proceeds from step 605 to 606 to update FS by calculating the equation (C−M)/ N−$N_{MCR}$) and setting the quotient as FS. Therefore, the fair share value FS is equal to (150−60)/(3−1)=40 Mbps.

If BRM cells are successively received from $VC_1$, $VC_2$ and $VC_3$, steps 403, 312 and 313 are repeatedly executed, yielding the following results which gives a total traffic rate of 140 Mbps:

Step 403-1: $ACR_1$=max(50/1.33, 40)=40 Mbps

Step 311-1: $ACR_1$=min(40, 50)=40 Mbps

Step 312-1: $ACR_1$=max(40, 30)=40 Mbps

Step 403-2: $ACR_2$=max(50/1.267, 40)=40 Mbps

Step 311-2: $ACR_2$=min(40, 50)=40 Mbps

Step 312-2: $ACR_2$=max(40, 10)=40 Mbps

Step 403-3: $ACR_3$=max(100/1.2, 40)=83.3 Mbps

Step 311-3: $ACR_3$=min(83.3, 50)=50 Mbps

Step 312-3: $ACR_3$=max(50, 60)=60 Mbps

What is claimed is:

1. A method for controlling the traffic of a source end system connected by an access link to an ATM network, wherein the source end system is connected through a plurality of virtual channels to destination end systems to exchange resource management (RM) cells at periodic intervals and to transmit data cells at allowed cell rates (ACRs) respectively set for the virtual channels, said access link having a predetermined link capacity, the method comprising the steps of:

a) transmitting a forward RM cell through an associated virtual channel;

b) determining a sum of ACR values of said virtual channels, in response to receipt of a backward RM cell through the associated virtual channel, and comparing the sum of ACR values with the predetermined link capacity; and c) resetting a current ACR value of the associated virtual channel equal to a lower-than-previous value when said sum of ACR values is in excess of said predetermined link capacity.

2. A method as claimed in claim 1, wherein the step (c) comprises the steps of:

producing a link load value representing said sum of ACR values divided by said predetermined link capacity; and resetting said ACR value to the lower-than-previous value according to said link load value.

3. A method as claimed in claim 1, wherein the step (c) further comprises a step of producing a link load value representing said sum of ACR values divided by said predetermined link capacity, and wherein said lower-than-previous value is equal to a previous ACR value of the associated virtual channel divided by the link load value.

4. A method as claimed in claim 1, wherein the step (c) comprises the steps of:

producing a link load value representing said sum of ACR values divided by said predetermined link capacity;

producing a fair share value representing a weighted mean of ACR values of virtual channels through which backward RM cells are successively received;

comparing the current ACR value of the associated virtual channel with the fair share value;

dividing said current ACR value by said link load value if the current ACR value is greater than said fair share value;

comparing the divided ACR value with said fair share value; and resetting the current ACR value equal to the divided ACR value if the divided ACR value is greater than the fair share value, and resetting the current ACR value equal to the fair share value if the fair share value is greater than the divided ACR value.

5. A method as claimed in claim 4, wherein said fair share value is derived from the relation k·Y+(1−k)X, where X represents a weighted mean value of ACR values which was derived in response to receipt of a previous backward RM cell, Y represents said current ACR value and k represents a constant smaller than unity.

6. A method as claimed in claim 1, wherein the step (c) comprises the steps of:

producing a link load value representing said sum of ACR values divided by said predetermined link capacity;

producing a fair share value representing said predetermined link capacity divided by the number of said virtual channels;

comparing the current ACR value of the associated virtual channel with the fair share value;

dividing said current ACR value by said link load value if the current ACR value is greater than the fair share value;

comparing the divided ACR value with the fair share value; and resetting said current ACR value equal to the divided ACR value if the divided ACR value is greater than the fair share value, and resetting said current ACR value equal to the fair share value if the fair share value is greater than the divided ACR value.

7. A method as claimed in claim 1, wherein each of said virtual channels has a minimum cell rate (MCR), and wherein the step (c) comprises the steps of:

producing a link load value representing said sum of ACR values divided by said predetermined link capacity;

dividing said predetermined link capacity by the number of said virtual channels;

producing a fair share value representing the relation $(C-M)/N-N_{MCR}$, where C is the predetermined link capacity, M is a total of MCR values of ones of said virtual channels which are greater than said divided link capacity, N is a number of all of said virtual channels and $N_{MCR}$ is a number of said ones of said virtual channels;

comparing the current ACR value of the associated virtual channel with the fair share value;

dividing said current ACR value by said link load value if said current ACR value is greater than the fair share value;

comparing the divided ACR value with the fair share value; and resetting said current ACR value equal to the fair share value if the fair share value is greater than the divided ACR value, and resetting said current ACR value equal to the divided ACR value if the divided ACR value is greater than the fair share value.

8. A method as claimed in claim 1, wherein said access link is shared by a virtual channel having a service class higher than service classes of said virtual channels, and wherein said predetermined link capacity is an effective link capacity equal to a maximum link capacity of said access link minus a bandwidth of said virtual channel of higher service class.

9. A method as claimed in any one of claims 1 to 8, wherein a backward RM cell contains an explicit rate (ER) value inserted by said ATM network, and each of said virtual channels has a minimum cell rate (MCR), and wherein the step (c) further comprises the steps of:

comparing the reset ACR value with said ER value;

selecting the reset ACR value if the reset ACR value is smaller than said ER value, and selecting the ER value if the ER value is smaller than the reset ACR value, as an updated ACR value;

comparing the updated ACR value with an MCR value of said associated virtual channel; and selecting the updated ACR value if the updated ACR value is smaller than said MCR value and selecting the MCR value if the MCR value is smaller than the updated ACR value, as a new ACR value for said associated virtual channel.

* * * * *